March 14, 1961 R. J. NAMSICK 2,974,912
SHOCK ABSORBER
Filed Sept. 26, 1958 2 Sheets-Sheet 1
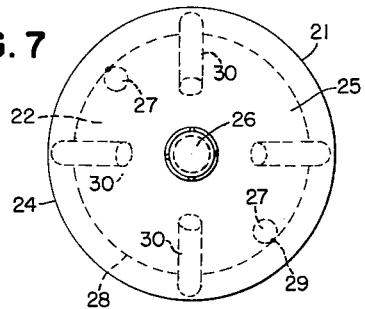
FIG. 7
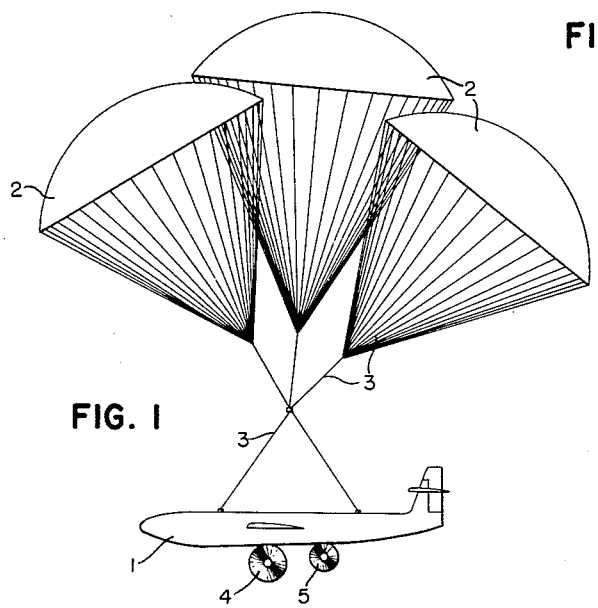
FIG. 1
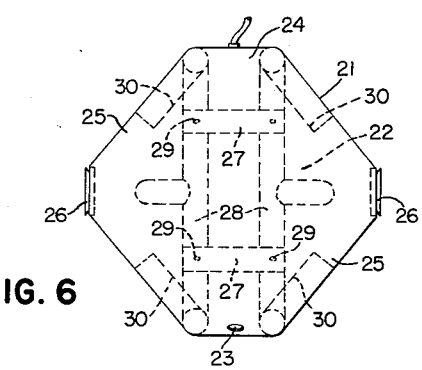
FIG. 6
FIG. 4 FIG. 5
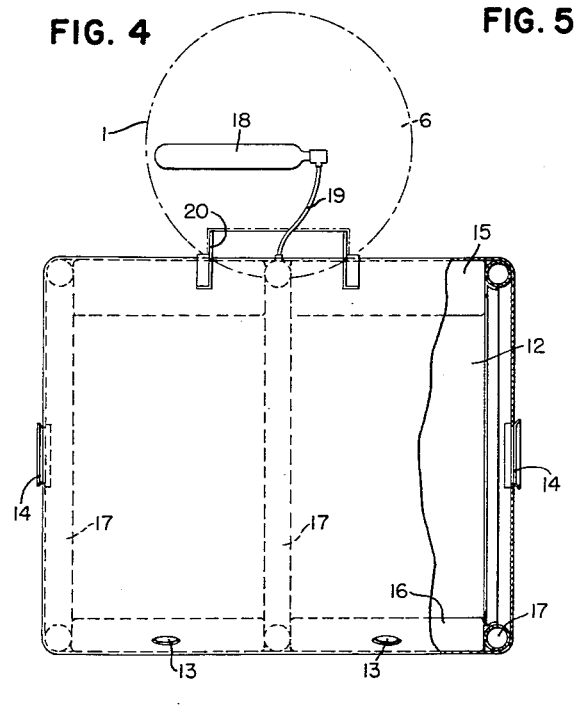
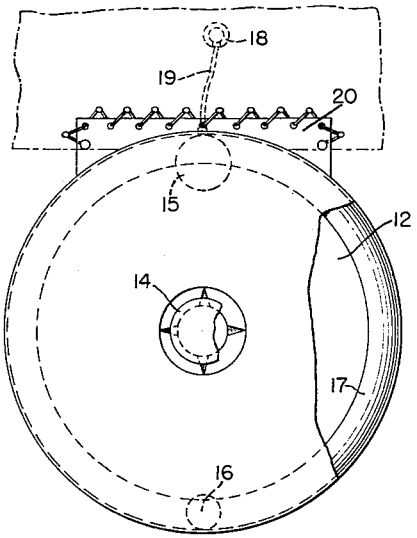
*INVENTOR.*
RAYMOND J. NAMSICK
BY
*P. L. Miller*
ATTORNEY March 14, 1961 R. J. NAMSICK 2,974,912
SHOCK ABSORBER
Filed Sept. 26, 1958 2 Sheets-Sheet 2

INVENTOR.
RAYMOND J. NAMSICK
BY
ATTORNEY

United States Patent Office 2,974,912
Patented Mar. 14, 1961

2,974,912

SHOCK ABSORBER

Raymond J. Namsick, Akron, Ohio, assignor to The Goodyear Tire & Rubber Company, Akron, Ohio, a corporation of Ohio Filed Sept. 26, 1958, Ser. No. 763,618

14 Claims. (Cl. 244—138)

This invention relates to shock absorbers, particularly to decelerator bags for the recovery of missiles and the like.

One of the problems in the successful air drop of equipment or the recovery of missiles and similar objects used for training or test purposes is to provide some means to cushion the article and absorb the impact transmitted thereto on contact with the ground. Prior art devices have included inflated pneumatic bags and similar structures such as described in copending application Serial No. 656,304, filed May 1, 1957. The copending application describes an invention comprising a decelerator bag with a variable orifice which provides controlled deceleration of an article attached thereto when it contacts the ground. Although the device of the copending application is perfectly satisfactory for general use as a decelerator bag, there are instances where it is used with some difficulty. One such case is in the recovery of missiles, rocket nose cones, and the like which must carry the bags internally but have only limited capacities for storage. Such devices may also require heavier, stronger bags with the same or reduced bulk than is possible with the design of the invention of the copending application. Often the time available to effect inflation of the bag is limited and means is necessary to assure effective operation of a decelerator bag such as disclosed in the copending application.

It is a primary object of the present invention to provide a decelerator bag which may be stored in a comparatively small space within the device to be recovered. It is a further object to provide a decelerator bag which may be rapidly expanded and inflated in order to recover equipment being dropped from minimum altitudes. It is a still further object to provide a decelerator bag structure which will permit wide flexibility in the design shape of the main shock absorbing member. It is an additional object to provide a decelerator bag which not only permits controlled deceleration of an article attached thereto but also may provide a resilient cushion during the terminal phase of deceleration of the article. These and other objects will become clear from the following description and drawings in which:

Fig. 1 illustrates a typical use of decelerator bags made according to the present invention;

Fig. 4 illustrates one form of a decelerator bag;

Fig. 5 is an end view of the decelerator bag of Fig. 4;

Fig. 6 is a modified form of a decelerator bag:

Fig. 7 is an end view of the bag of Fig. 6;

Figure 2:
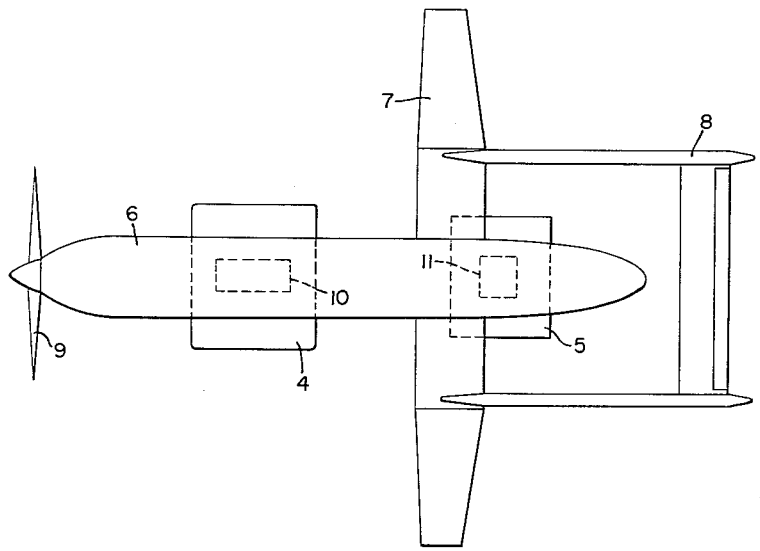
Fig. 2 is a plan view of a missile having attached thereto decelerator bags according to the present invention.

The recovery of missiles, nose cones, etc. used for training or evaluation purposes often involves the deceleration of delicate mechanisms, oft-times from low altitudes and with relatively short descent periods. The decelerator bag of the present invention is primarily useful in aiding the recovery of such objects without substantial damage after the in-flight phase is completed. However, it has other uses as a shock absorber and, as will clearly appear, may be modified in a variety of ways to suit a particular purpose. In Fig. 1, a missile 1 is attached to parachutes 2 by means of a conventional harness and shrouds 3 and is shown in the air drop phase following the completion of the flight phase. Decelerator bags 4 and 5 are secured to the undercarriage of the missile 1 to provide controlled deceleration of the missile when it strikes the ground and thereby prevent damage to delicate missile mechanisms, testing equipment, and similar devices. The missile may be seen in more detail in Figs. 2 and 3. The missile is of the propeller driven type generally used in training purposes and in short range tactical missions. However, the decelerator bags may be used on any type of missile or other object which is to be recovered or dropped from the air. Referring to Fig. 2, the missile has a fuselage 6, a laterally disposed wing 7, and an empennage 8. A conventional propulsion unit 9 is located on the forward section of the fuselage. The propulsion unit illustrated in Fig. 2 is a propeller driven type although it could be jet, turbo jet, or rocket, and could be disposed on the aft section of the missile if desired. Decelerator bags 4 and 5 are attached to the undercarriage of fuselage 6. Although the decelerator bags 4 and 5 are illustrated and will be described as of different sizes and somewhat different styles, it is obvious that they could be of equal size and of the same style if desired, the illustrated design and placement of the bags being for the purpose of accommodating the weight distribution of the particular missile shown when it strikes the ground.

Figure 3:
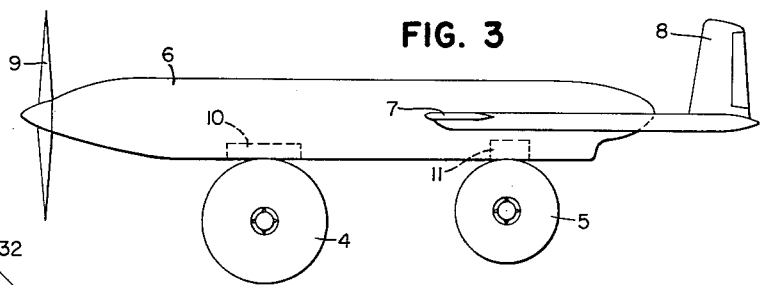
Fig. 3 is a side elevation of the missile in Fig. 2.

Various other portions of the missile and additional features of the decelerator bags are shown in Fig. 3. In that figure the cavities 10 and 11 which house the decelerator bags during the in-flight phase may be clearly seen. As illustrated in Fig. 2, the decelerator bags are substantially cylindrical with the major axis horizontal and transverse of the missile length. The bags are also preferably somewhat longer than the missile beam in order to provide a cradle upon ground contact and to minimize side motion during deceleration.

The decelerator bags illustrated in Figs. 2 and 3 are the type shown in detail in Fig. 4 in which the bag comprises a main inflation chamber 12 defined by the generally cylindrical bag constructed of rubberized fabric. The bag 12 is closed to the atmosphere with the exception of the inflating ports 13 located in the lower portion thereof. The walls of decelerator bags need not necessarily be constructed of air-impervious material but must have only limited porosity for air-retention purposes. Nylon fabric with a skim coat of rubber has been found to be preferable since it provides limited porosity with minimum weight. Other fabrics and coating materials may, of course, be used. The bag is provided at each end with a variable orifice 14 similar to that described in the copending application previously referred to. Since the orifice per se forms no part of the present invention and is adequately described in the copending application, it will not be described in detail here.

In operation, after release from the missile compartment, the main bag 12 is inflated during the descent of the missile by air entering the ports 13. Because of the shape and disposition of the bag which may produce substantial air resistance during descent tending to hold the bag collapsed, and in order to assure that the bag opens rapidly to receive the maximum amount of air during the relatively short drop period, the bag is provided with a framework of inflatable tubular elements which, when actuated, cause the bag to expand rapidly to full volume. The framework illustrated comprises a longitudinal inflatable tube 15 along the top of the bag, a similar tube 16 along the bottom of the bag, and a plurality of toroidal tubes 17 at spaced intervals encompassing the axis of the bag and located in contact with the peripheral walls. The tubes are preferably interconnected so that they can be inflated from a common source indicated by the inflation bottle 18 and the air connector 19 shown situated within the fuselage 6 of the missile 1. In certain instances it is possible to use a foam elastomer filling in the expansible framework to open the bag to full volume in a short time. In such cases, the foam elements may be held in a compressed state until the container or bag is released from the object being recovered at which time the foam expands to extend the framework and, hence, to open the bag to full volume. Although the pneumatic inflation system may not always be necessary where foam elements are used, it may be desirable to utilize a combination of an interconnected cellular foam such as polyurethane with the inflation system illustrated. This combination provides minimum expansion time of the bag. In addition, foams of the polyurethane type provide added terminal cushioning with minimum bounce factor due to the inherently high hysteresis of the material.

When the missile begins its descent, parachutes 2 and the decelerator bags 4 and 5 may be automatically ejected from the missile 1 by any of a variety of well known devices. It has been found that the bag may be effectively ejected from the missile compartment solely by inflation of the expansible framework previously described although mechanical ejectors may be used when desired. The release of the bags with the triggering of the inflation system expands tubular framework causing the main chamber to instantaneously assume its maximum volume. In this way, complete inflation of the bag is assured even though the descent time of the missile is short and high shock absorbing capability must be provided before ground contact. Upon contact with the ground, the pressure in the bag 12 increases rapidly due to impact which forces the plugs from the variable orifices 14 permitting the rapid escape of the air trapped in the main chamber. The orifices, which are described in the copending application referred to, comprise a diaphragm having an opening therein with a plurality of serrations extending radially outwardly from the periphery of the aperture. A resilient grommet is attached to the diaphragm, substantially coextensive with the aperture therethrough, and provides an elastic control of the expansion and contraction of the orifice due to the pressure against the serrated portions thereof. The bag is thus deflated in a controlled manner to assure that minimum shock is transmitted to the missile. When the main chamber of the bag is fully deflated, the framework of tubular elements, although it tends to collapse or fold, may be allowed to remain inflated to provide a terminal cushion for the missile as it contacts the ground. If desired, however, plug type orifices may be provided in the framework to deflate it upon ground impact to fully deflate the decelerator bag to minimize bounce and toppling.

The decelerator bags are preferably provided with a variable orifice on each end of the bag in order to provide equal deflation forces in opposite directions and, hence, to reduce the possibility of side sway or topple as the bag deflates. It is obvious that a greater or lesser number of larger or smaller orifices could be used as desired, the controlling criteria being in general the maximum impact and, hence, maximum deceleration rate to which the missile may be subjected without substantial harm thereto.

An end view of a typical decelerator bag is shown in Fig. 5 which will aid in understanding the construction of the variable orifice and also the relative placement of the bag expanding tubular framework. The decelerator bags may be secured to the missile in any number of ways, the method illustrated in Fig. 5 being a lacing structure 20 secured to the interior of the stowage chamber of the missile. The mounting or connecting element 20 between the bag and the missile not only serves to position and retain the bag with regard to the missile but also to absorb transverse forces acting on the bag when in ground contact due to cross winds and similar phenomena acting against the missile. Therefore, the lacing of the structure 20 must be at least nominal strength to withstand such strains.

Fig. 6 illustrates a modified form of decelerator bag particularly designed to provide a large deceleration volume in a bag which can be stored in a relatively small space. The bag 21 has a main inflation chamber 22 inflated by air entering through the port 23 in the bottom of the bag. To minimize bulk, the bag is preferably constructed with a substantially cylindrical mid-section 24 having end sections 25 comprising truncated cones. A variable orifice 26 is situated in the small end of the frusto-conical portions 25. The tubular framework supporting the central cylindrical section is similar to that previously described with respect to the bag in Fig. 4 except that the horizontal tubes 27 are laid on the toroidal elements 28 and interconnected for inflation purposes by perforated rivets 29. This construction may be used to minimize the labor necessary to lap and seal intersecting tubular elements as used in the construction of Fig. 4. Extending out from the central framework in the direction of the major axis of the bag are elongated tubes 30 which when inflated expand the frusto-conical sections to full volume. The tubes 30 may extend only a portion of the way out towards the end of the cone sections or all the way to the orifice area as illustrated in Fig. 8.

The operation of the bag is similar to that described with reference to Fig. 4. The bag shown in Fig. 6 and illustrated in end view in Fig. 7 may be used as the larger bag 4 attached to the forward portion of the missile 1 in Fig. 1.

Figure 8:
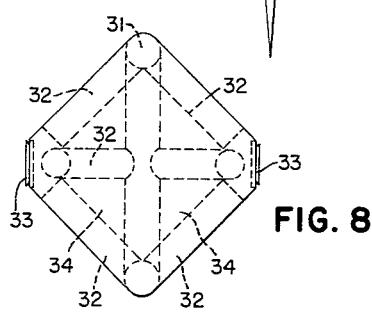
Fig. 8 is a further modified form of the decelerator bag according to the present invention.

When it is desirable to minimize the cavity size for storing the bag, a shock absorber similar to the one illustrated in Fig. 8 may be used and may correspond to bag 5 attached to the aft section of the missile 1 in Fig. 1. In Fig. 8 the central cylindrical section of the bag described with reference to Fig. 6 is eliminated and the tubular framework comprises a toroidal center tube 31 with the elongated finger tubes 32 extending in the direction of the longitudinal axis to the orifices 33. The inflation chamber then comprises two truncated cone sections 34 with their large bases coincident, each provided with a variable orifice 33 in the smaller end.

It is obvious that bags of a variety of shapes can be designed for special purposes utilizing the inflatable framework principle to assure that the bag is fully inflated by the atmosphere in the shortest possible time and, if desired, to provide a terminal cushion to protect delicate mechanisms being recovered. However, the framework may be provided with an orifice to fully deflate the apparatus after substantially all deceleration is complete. This may be done to avoid possible blowout of the tubes in order to assure maximum bag life in repetitive service situations and also to minimize bounce or the tendency to cause toppling.

In addition to the advantageous savings in bulk and weight through the use of frusto-conical sections, such a design provides maximum cushioning area during the terminal deflation phase since the bag volume is, at that time, essentially a function of the major axis of the bag and the minimum diameter of the end sections. Thus, the bag design and the variable orifice combine to control the rate of deceleration. Furthermore, due to the elongated nature of the bag, it will provide a pneumatic cradle extending around the missile sides to minimize side sway or topple during the deceleration period.

Figure 9:
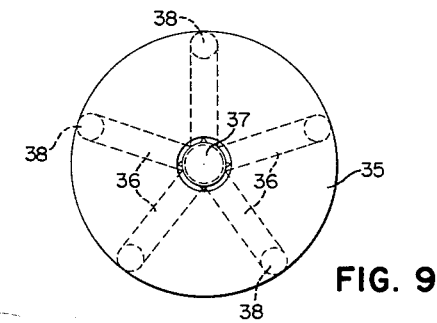
Fig. 9 is a modified form of a portion of the decelerator bag.
Figure 10:
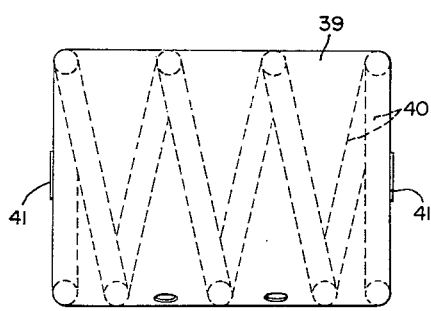
Fig. 10 is an additional form of a decelerator bag of the present invention.

Figs. 9 and 10 illustrate modified forms of the framework which may be used to expand the delecerator bag to full volume. In Fig. 9 the means to expand the bag 35 comprises a series of radially disposed tubes 36 arranged similarly to the spokes of a wheel and centered on the orifice 37. It will be understood that a similar structure is located on the other end of the bag. The radial tubes 36 are interconnected by tubes 38 extending longitudinally along the bag envelope. Each opposite pair of tubes 36 may have a connecting tube 38 if desired or only some of the tubes need be interconnected if sufficient longitudinal strentgh to expand the bag is secured thereby. Of course, it is preferable that the tubes be interconnected in some way to require only a single inflation bottle for the system.

Fig. 10 illustrates in longitudinal cross section a bag 39 which utilizes a helically disposed tube 40 which follows the bag wall in a spiral from bag end to bag end. Thus, a single tube will provide both longitudinal and transverse expansion of the bag, eliminating the need for interconnecting of tubes and splicing at the junctures. The bag is, of course, provided with variable orifices 41 at each end which are similar to those previously referred to.

While certain representative embodiments and details have been shown for the purpose of illustrating the invention, it will be apparent to those skilled in this art that various changes and modifications may be made therein without departing from the spirit or scope of the invention.

I claim:

1. A decelerator bag for ground recovery of airborne equipment comprising, in combination, a flexible inflatable substantially cylindrical container normally restrained in a collapsed condition against said equipment; inlet means in the wall thereof to inflate said container upon the release thereof; expansible flexible means arranged in the marginal portions of said container and normally in a contracted condition, said means distending substantially to define the inflated shape of said container and expand it to substantially full volume upon release of said container; means to distend said expansible means upon release of said container; and variable orifice means mounted in each end of said container to provide controlled deflation of said container upon occurrence of an impact thereto.

2. A decelerator bag for ground recovery of airborne equipment comprising, in combination, a flexible inflatable substantially cylindrical container normally restrained in a collapsed condition against said equipment; inlet means in the wall thereof to inflate said container; a framework of inflatable members arranged in the marginal portions of said container and normally in a contracted condition, said members distending substantially to define the inflated shape of said container and expand it to substantially full volume upon release of said container; means to inflate said framework upon release of said container; and variable orifice means mounted in each end of said container and adapted to provide controlled deflation of said container upon occurrence of impact thereto.

3. A decelerator bag for ground recovery of airborne equipment comprising, in combination, a flexible inflatable substantially cylindrical container normally restrained in a collapsed condition against said equipment and having, when inflated, two mutually perpendicular axes with a substantially circular cross section in a plane normal to one of said axes; inlet means in the wall thereof to inflate said container upon the release thereof; expansible flexible means arranged in the marginal portions of said container and normally in a contracted condition, said means distending substantially to define the inflated shape of said container and expand it to substantially full volume upon release of said container; means to distend said expansible means upon release of the container; and variable orifice means mounted in each end of said container to provide controlled deflation thereof upon the occurrence of ground impact thereto.

4. A decelerator bag as claimed in claim 3 in which said expansible means comprises at least one annular member encircling one axis of the container and a plurality of elongated members extending from said annular member substantially in the direction of said one axis.

5. A decelerator bag for ground recovery of airborne equipment comprising, in combination, a flexible inflatable container normally restrained in a collapsed condition against said equipment and having, when inflated, a major axis and a minor axis arranged for attaching to said equipment with the major axis substantially horizontal and transverse thereof; inlet means in the wall thereof to inflate the container upon the release thereof; expansible means arranged in the marginal portions of said container and normally in a contracted condition, said means distending substantially to define the inflated shape of said container and expand it to substantially full volume upon the release thereof; means to distend said expansible means upon release of said container; and variable orifice means mounted in each end of said container to provide controlled deflation thereof upon the occurrence of ground impact thereto.

6. A bag as claimed in claim 5 in which said expansible means comprises at least one annular inflatable tubular element encircling the major axis of said container and a plurality of inflatable tubular elements extending from said annular element in substantially the direction of said major axis.

7. A decelerator bag for the ground recovery of airborne equipment comprising, in combination, a flexible inflatable container normally restrained in a collapsed condition against said equipment and having, when inflated, two mutually perpendicular axes with a substantially circular cross section in a plane normal to one of said axes; inlet means in the wall thereof to inflate said container upon release thereof, pneumatic means arranged in the marginal portions of said container and normally in a contracted condition, said means distending substantially to define the inflated shape of said container and expand it to substantially full volume upon release of said container; means to distend said pneumatic means upon release of said container; and variable orifice means mounted in each end of said container and adapted to provide controlled deflation thereof upon the occurrence of ground impact thereto.

8. A bag as claimed in claim 7 in which said pneumatic means comprises at least one annular inflatable tubular element disposed in a plane substantially perpendicular to said one axis and a plurality of elongated tubular elements extending along said wall substantially in the direction of said axis.

9. A decelerator bag for ground recovery of airborne equipment comprising an elongated inflatable container normally restrained in a collapsed condition against said equipment and having, when inflated, a major axis and a minor axis arranged for attaching to said equipment with the major axis substantially horizontal and transverse thereof and having a substantially circular cross section transversely of said major axis; inlet means in the wall thereof to inflate said container upon the release thereof; a framework of inflatable tubular members arranged in the marginal portions of said container and normally in a contracted condition, said members distending substantially to define the inflated shape of said container and expand said container to full volume upon release thereof, said framework comprising at least one annular inflatable tubular element encircling said major axis and a plurality of elongated tubular elements extending from said annular element substantially in the direction of said major axis; means to inflate said framework upon the release of said container; and variable orifice means mounted in each end of said container to provide controlled deflation thereof upon the occurrence of ground impact thereto.

10. A bag as claimed in claim 9 in which said container includes end portions having a frusto-conical configuration.

11. A decelerator bag for ground recovery of airborne equipment comprising, in combination, a flexible inflatable container normally restrained in a collapsed condition against said equipment and having, when inflated, a major axis and a minor axis with a substantially circular cross section normal to the major axis and arranged for attaching to the equipment to be recovered with the major axis substantially horizontal and transverse thereof; inlet means in the wall thereof to inflate said container upon the release thereof; pneumatic means arranged in the marginal portions of said container and in a normally contracted condition, said means distending substantially to define the inflated shape of said container and expand the container to substantially full volume upon the release thereof, said pneumatic means comprising at least one annular inflatable tubular member encircling said major axis and a plurality of elongated inflatable tubular members extending from said annular member substantially in the direction of said major axis; means to inflate said pneumatic means upon the release of said container; and variable orifice means mounted in each end of said container to provide controlled deflation thereof upon the occurrence of ground impact thereto.

12. A bag as claimed in claim 11 in which the container is substantially cylindrical and the pneumatic means comprises at least one toroidal inflatable element arranged along the circumferential margin of each base of the cylinder with a plurality of interconnecting tubular elements between said toroidal elements.

13. A bag as claimed in claim 11 in which the container comprises a substantially cylindrical center portion with frusto-conical end portions and the pneumatic means comprises at least one toroidal inflatable element arranged along the circumferential margin of each base of the cylinder and its associated end portion and a plurality of elongated tubular elements extending outwardly from said center portion along the wall of said frusto-conical end portions.

14. A bag as claimed in claim 11 in which said container comprises two frusto-conical sections arranged with the larger bases coinciding and said pneumatic means comprises a toroidal inflatable element arranged about the circumferential margin of the common bases and a plurality of elongated tubular elements extending outwardly from the toroidal element along the wall of the frusto-conical sections.

References Cited in the file of this patent

UNITED STATES PATENTS

| | | |
|---|---|---|
| 1,757,918 | Mulzer | May 6, 1930 |
| 1,861,784 | Brown et al. | June 7, 1932 |
| 2,495,486 | Stevenson | Jan. 24, 1950 |
| 2,706,605 | Rose et al. | Apr. 19, 1955 |
| 2,713,466 | Fletcher et al. | July 19, 1955 |
| 2,721,048 | Warden | Oct. 18, 1955 |

FOREIGN PATENTS

| | | |
|---|---|---|
| 572,152 | Great Britain | Sept. 25, 1945 |